(12) United States Patent
Kwon et al.

(10) Patent No.: US 8,325,812 B2
(45) Date of Patent: Dec. 4, 2012

(54) MOTION ESTIMATOR AND MOTION ESTIMATING METHOD

(75) Inventors: Oh-jae Kwon, Anyang-si (KR);
Jong-sul Min, Hwaseong-si (KR);
Myung-jae Kim, Anyang-si (KR);
Ho-seop Lee, Seoul (KR); Hwa-seok Seong, Suwon-si (KR); Min-kyung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1435 days.

(21) Appl. No.: 11/641,863

(22) Filed: Dec. 20, 2006

(65) Prior Publication Data

US 2007/0147506 A1 Jun. 28, 2007

(30) Foreign Application Priority Data

Dec. 28, 2005 (KR) ........................ 10-2005-0131937

(51) Int. Cl.
*H04N 11/02* (2006.01)
*H04N 11/04* (2006.01)

(52) U.S. Cl. .................................................. 375/240.16

(58) Field of Classification Search ........................ None
See application file for complete search history.

(56) References Cited

U.S. PATENT DOCUMENTS

| | | | |
|---|---|---|---|
| 5,317,397 A | 5/1994 | Odaka et al. | |
| 5,506,622 A * | 4/1996 | Kim | 375/240.16 |
| 6,370,194 B2 * | 4/2002 | Nishikawa | 375/240.16 |
| 6,424,676 B1 * | 7/2002 | Kono et al. | 375/240.16 |
| 7,336,838 B2 * | 2/2008 | Hur et al. | 382/236 |
| 2001/0004739 A1 * | 6/2001 | Sekiguchi et al. | 707/100 |
| 2001/0014124 A1 * | 8/2001 | Nishikawa | 375/240.16 |
| 2004/0076333 A1 * | 4/2004 | Zhang et al. | 382/238 |
| 2005/0063467 A1 * | 3/2005 | Hekstra et al. | 375/240.16 |
| 2005/0207494 A1 * | 9/2005 | Ahn et al. | 375/240.16 |

FOREIGN PATENT DOCUMENTS

| | | |
|---|---|---|
| CN | 1675848 A | 9/2005 |
| EP | 1 548 647 A2 | 6/2005 |
| EP | 1 592 248 A1 | 11/2005 |

(Continued)

OTHER PUBLICATIONS

De Haan G, Bellers E.B., Deinterlacing-an overview, Sep. 1999, Proceedings of the IEEE, vol. 86 Issue 9, p. 1839.*

(Continued)

*Primary Examiner* — Thai Tran
*Assistant Examiner* — Sunghyoun Park
(74) *Attorney, Agent, or Firm* — Sughrue Mion, PLLC

(57) ABSTRACT

A motion estimator for generating an interpolation frame based on current and previous frames is provided. The motion estimator includes: a first candidate motion vector calculating unit which divides the current frame into plural blocks and generates plural first candidate motion vector groups, each group including a first candidate motion vector for each of the blocks calculated based on a previous motion vector previously estimated; a second candidate motion vector calculating unit which calculates plural second candidate motion vectors for each of the blocks, each of the second candidate motion vectors being calculated based on a respective first candidate motion vector included in each of the first candidate motion vector group; and a final motion vector deciding unit which selects a final motion vector for each of the blocks from among the second candidate motion vectors, the interpolation frame being generated based on the final motion vector.

32 Claims, 5 Drawing Sheets

FOREIGN PATENT DOCUMENTS

| | | | |
|---|---|---|---|
| GB | 2 205 706 A | | 12/1988 |
| KR | 199-0073648 A | | 10/1999 |
| KR | 10-2002-0028625 A | | 4/2002 |
| KR | 10-2003-0044691 A | | 6/2003 |
| KR | 10-2005-0013847 A | | 2/2005 |
| KR | 1020050013847 | * | 5/2005 |
| WO | 2004/014060 A2 | | 2/2004 |

OTHER PUBLICATIONS

Ates H.F., Altunbasak Y, SAD reuse in hierarchical motion estimation for the H.264 encoder, Mar. 2005, Acoustics Speech and Signal Processing 2005 Procedings (ICASSP '05) IEEE International Conference on, vol. 2, p. ii/905.*

Rath G.B., Makur A, Iterative least squares and compression based estimations for a four-parameter linear global motion model and global motion compensation, Oct. 1999, Circuits and Systems for Video Technology IEEE Transactions on, vol. 9 Issue 7, p. 1075.*

Min Kyu Park, Moon Gi Kang, Kichul Nam, Sang Gun Oh, New edge dependent deinterlacing algorithm based on horizontal edge pattern, Nov. 2003, Consumer Electronics IEEE Transactions on, vol. 49 Issue 4, p. 1508.*

Machine translation of Korean Patent Application of KR 10-2005-0013847 (Inventors Seong Hui Lee, O Jae Kwon), Motion estimation apparatus considering correlation between blocks and method of the same, Feb. 5, 2005.*

Haan, G. et al., "An Efficient True-Motion Estimator Using Candidate Vectors from a Parametric Motion Model", IEEE Transactions on Circuits and Systems for Video Technology, Feb. 1998, pp. 85-91, vol. 8, No. 1, IEEE Service Center, Piscataway, NJ, XP011014442.

* cited by examiner

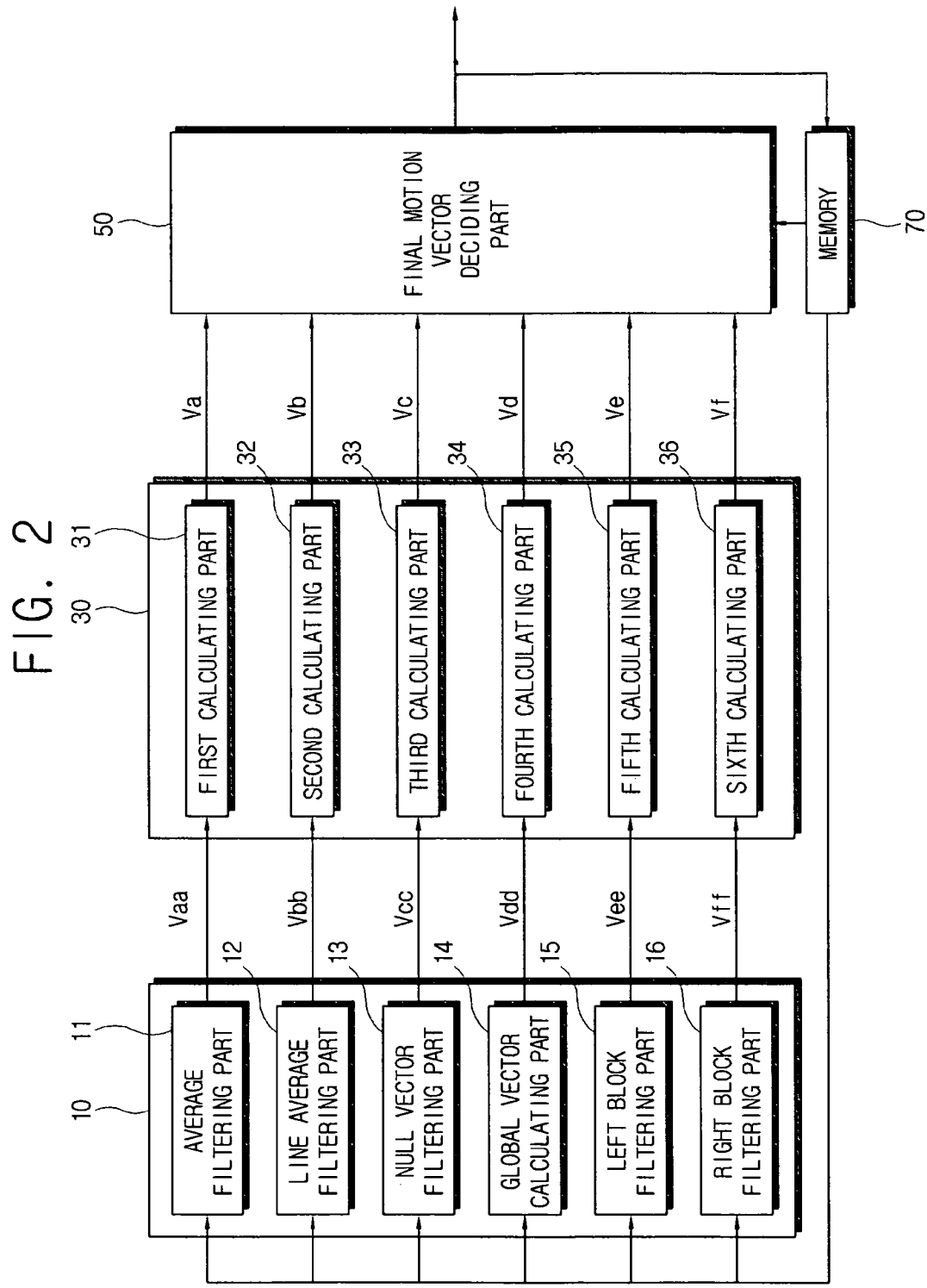

MOTION ESTIMATOR AND MOTION
ESTIMATING METHOD

CROSS-REFERENCE TO RELATED
APPLICATIONS

This application claims priority from Korean Patent Application No. 10-2005-0131937, filed on Dec. 28, 2005, in the Korean Intellectual Property Office, the disclosure of which is incorporated herein by reference.

BACKGROUND OF THE INVENTION

1. Field of the Invention

Apparatuses and methods consistent with the present invention relate to a motion estimator and a motion estimating method, and more particularly, to a motion estimator and a motion estimating method for estimating frame motion in order to generate an interpolation frame to be inserted between two adjacent frames.

2. Description of the Related Art

In general, a frame rate conversion refers to converting a frequency of an input video signal to a frequency matching an output format. To this end, for example, additional frames are inserted between original frames to convert a video signal of 50 Hz to a video signal of 100 Hz. If the original frames are merely repeated or a temporal linear interpolation method is used for the frame rate conversion, a motion blur effect or the like may occur. Therefore, it is common that a motion estimation and compensation technique is used as one of high quality frame rate convertion methods effective in reducing such a motion blur effect.

In recent years, various frame interpolating methods using such a motion estimation and compensation technique have been actively developed.

Related art motion estimation methods define a plurality of candidate motion vectors, select a final motion vector on the basis of a motion prediction error value, and generate an interpolation frame based on the selected final motion vector. The related art motion estimation methods estimate motion on the assumption that a candidate motion vector represents expected motion for a reference block provided in a current frame and the final motion vector corresponding to real motion of the frame has a minimal motion prediction error value.

However, in the related art motion estimation methods, a vector, which does not represent real motion, may be wrongly estimated as the final motion vector, and if the candidate motion vectors predict motion of the reference block wrongly, motion vectors may continue to be wrongly estimated. In addition, the above-mentioned motion blur effect may be further increased.

SUMMARY OF THE INVENTION

The present invention provides a motion estimator and a motion estimating method, which are capable of generating a motion vector closest to real motion, on the basis of which an interpolation frame is generated.

The foregoing and/or other aspects of the present invention are also addressed by providing a motion estimator for generating an interpolation frame based on a current frame and a previous frame, comprising: a first candidate motion vector calculating unit which divides the current frame into a plurality of blocks and generates a plurality of first candidate motion vector groups, each of the first candidate motion vector group comprising a first candidate motion vector for each of the plurality of the blocks calculated based on a previous motion vector previously estimated; a second candidate motion vector calculating unit which calculates a plurality of second candidate motion vectors for each of the plurality of the blocks, each of the plurality of the second candidate motion vectors being calculated based on a respective first candidate motion vector included in each of the first candidate motion vector group; and a final motion vector deciding unit which selects a final motion vector for each of the plurality of the blocks from among the plurality of the second candidate motion vectors. Thus, the interpolation frame is generated based on the final motion vector.

According to an aspect of the present invention, the previous motion vector comprises a final motion vector for the previous frame.

According to another aspect of the present invention, the first candidate motion vector calculating unit sets each of the plurality of the blocks as a reference block, and averages previous motion vectors for the reference block and a plurality of blocks adjacent to the reference block to calculate a resultant average value as the first candidate motion vector for the reference block.

According to still another aspect of the present invention, the first candidate motion vector calculating unit sets each of the plurality of the blocks as a reference block, and averages previous motion vectors for a plurality of blocks included in a row in which the reference block is placed to calculate a resultant average value as the first candidate motion vector for the reference block.

According to still another aspect of the present invention, the magnitude of each of the previous motion vectors for the plurality of the blocks included in the row in which the reference block is placed is greater than a first threshold.

According to still another aspect of the present invention, a difference between the previous motion vectors for the plurality of the blocks included in the row in which the reference block is placed, and previous motion vectors for blocks adjacent to the reference block, is smaller than a second threshold.

According to still another aspect of the present invention, the first candidate motion vector calculating unit outputs the previous motion vector to the second candidate motion vector calculating unit as the first candidate motion vector.

According to still another aspect of the present invention, the previous motion vector is a null vector.

According to still another aspect of the present invention, the first candidate motion vector calculating unit sets each of the plurality of the blocks as a reference block, and calculates the first candidate motion vector for the reference block according to a global vector calculation equation.

According to still another aspect of the present invention, the first candidate motion vector calculating unit sets each of the plurality of the blocks as a reference block, and selects one of previous motion vectors for a plurality of adjacent blocks provided in one direction of the reference block as the first candidate motion vector for the reference block.

According to still another aspect of the present invention, a previous motion vector having a median magnitude of the previous motion vectors for the plurality of the adjacent blocks provided in the one direction of the reference block is selected as the first candidate motion vector for the reference block.

According to still another aspect of the present invention, the first candidate motion vector is selected according to the following equation:

$$\text{FIRST CANDIDATE} \atop \text{MOTION VECTOR} = \begin{cases} Va, \text{ if } |Va-Vc| \leq |Vb-Vc| \text{ and } |Va-Vb| \leq |Vc-Vb| \\ Vb, \text{ if } |Vb-Va| \leq |Vc-Va| \text{ and } |Vb-Vc| \leq |Va-Vc| \\ Vc, \text{ if } |Vc-Va| \leq |Vb-Va| \text{ and } |Vc-Vb| \leq |Va-Vb| \end{cases}$$

where, Va, Vb and Vc denote the previous motion vectors corresponding to three adjacent blocks provided in the one direction of the reference block.

According to still another aspect of the present invention, the plurality of the adjacent blocks provided in the one direction of the reference block comprises one of a plurality of blocks included in a column provided in the left of the reference block and a plurality of blocks included in a column provided in the right of the reference block.

According to still another aspect of the present invention, the second candidate motion vector calculating unit divides the current frame into the plurality of blocks, sets each of the plurality of blocks as a reference block, compares the reference block with a search region set in the previous frame based on the respective first candidate motion vector included in each of the first candidate motion vector group, and calculates each of the second candidate motion vectors based on a result of the comparison.

According to still another aspect of the present invention, in order to calculate each of the second candidate motion vectors, the second candidate motion vector calculating unit determines similarity between the reference block and the search region.

According to still another aspect of the present invention, the similarity between the reference block and the search region is determined based on a motion prediction error value with respect to the reference block.

According to still another aspect of the present invention, the motion prediction error value is calculated according to a block matching algorithm.

According to still another aspect of the present invention, the final motion vector deciding unit selects the final motion vector for each of the plurality of the blocks based on a motion prediction error value of each of the second candidate motion vectors.

According to still another aspect of the present invention, the final motion vector deciding unit selects the final motion vector based on a motion prediction error value of each of the second candidate motion vectors and a vector difference between each of the second candidate motion vectors and previous motion vectors corresponding to blocks adjacent to the reference block.

According to still another aspect of the present invention, the final motion vector deciding unit calculates the vector difference by giving different weights to the previous motion vectors corresponding to the adjacent blocks based on distances between the reference block and the adjacent blocks.

According to still another aspect of the present invention, the final motion vector deciding unit calculates the vector difference according to the following equation, $$D(V') = \sum_{Vi \in S} Wi \times |V' - Vi|$$

where, D(V') denotes the vector difference, Wi denotes a weight for each of the adjacent blocks, V' denotes each of the second candidate motion vectors, Vi denotes a previous motion vector corresponding to each of the adjacent blocks, and S denotes the search region.

According to still another aspect of the present invention, the final motion vector deciding unit selects a second candidate motion vector, having a minimum value of a cost function determined by the following equation, as the final motion vector:

$$E(V') = \Phi(V') + \Upsilon \times D(V')$$
$$\Phi(V') = \sum_{X \in B} |Fn-1(X+V') - Fn(X)|$$
$$D(V') = \sum_{Vi \in S} Wi \times |V' - Vi|$$

where, E(V') denotes the cost function, Fn denotes the current frame, Fn−1 denotes the previous frame, Φ(V') denotes the motion prediction error value, γ denotes an adjustment factor for adjusting weights of the motion prediction error value and the vector difference, D(V') denotes the vector difference, B denotes the reference block, S denotes the search region, V' denotes each of the second candidate motion vectors, X denotes a coordinate of a pixel belonging to the reference block, and Vi denotes the previous motion vector corresponding to each of the adjacent blocks.

According to still another aspect of the present invention, the motion estimator further comprises a frame interpolating unit which generates an interpolation frame inserted between the current frame and the previous frame based on the final motion vector.

The foregoing and/or other aspects of the present invention may also be achieved by providing a motion estimator for generating an interpolation frame based on a current frame and a previous frame, the motion estimator comprising: a candidate motion vector calculating unit which divides the current frame into a plurality of blocks and calculates a plurality of candidate motion vectors for each of the plurality of the blocks based on a previous motion vector previously estimated; and a final motion vector deciding unit which selects a final motion vector based on a motion prediction error value of each of the plurality of candidate motion vectors and a vector difference between each of the plurality of the candidate motion vectors and previous motion vectors corresponding to blocks adjacent to a reference block which is set from among the plurality of the blocks. Thus, the interpolation frame is generated based on the final motion vector.

According to still another aspect of the present invention, the final motion vector deciding unit calculates the vector difference by giving different weights to the previous motion vectors corresponding to the adjacent blocks based on distances between the reference block and the adjacent blocks.

According to still another aspect of the present invention, the final motion vector deciding unit selects a candidate motion vector, having a minimum value of a cost function determined by the following equation, as the final motion vector:

$$E(V') = \Phi(V') + \Upsilon \times D(V')$$

$$\Phi(V') = \sum_{X \in B} |Fn - 1(X + V') - Fn(X)|$$

$$D(V') = \sum_{Vi \in S} Wi \times |V' - Vi|$$

where, E(V') denotes the cost function, Fn denotes the current frame, Fn−1 denotes the previous frame, Φ(V') denotes the motion prediction error value γ denotes an adjustment factor for adjusting weights of the motion prediction error value and a vector difference, D(V') denotes the vector difference, B denotes the reference block, S denotes a search region used to calculate the plurality of the candidate motion vectors, V' denotes each of the plurality of the candidate motion vectors, X denotes a coordinate of a pixel belonging to the reference block, Vi denotes the previous motion vector corresponding to each of the adjacent blocks, and Wi denotes a weight for each of the adjacent blocks.

The foregoing and/or other aspects of the present invention may also be achieved by providing a control method of a motion estimator for generating an interpolation frame based on a current frame and a previous frame, the method comprising: dividing the current frame into a plurality of blocks; generating a plurality of first candidate motion vector groups, each of the first candidate motion vector group comprising a first candidate motion vector for each of the plurality of the blocks calculated based on a previous motion vector previously estimated; calculating a plurality of second candidate motion vectors for each of the plurality of the blocks, each of the plurality of the second candidate motion vectors being calculated based on a respective first candidate motion vector included in each of the first candidate motion vector group; and selecting a final motion vector for each of the plurality of the blocks among the plurality of second candidate motion vectors. Thus, the interpolation frame is generated based on the final motion vector.

According to still another aspect of the present invention, the previous motion vector comprises a final motion vector for the previous frame.

According to still another aspect of the present invention, the calculating the plurality of first candidate motion vector groups comprises: setting each of the plurality of the blocks as a reference block; averaging previous motion vectors for a plurality of blocks included in a row in which the reference block is placed; and calculating a resultant average value as the first candidate motion vector for the reference block.

According to still another aspect of the present invention, the calculating the plurality of first candidate motion vector groups comprises: setting each of the plurality of the blocks as a reference block; and selecting one of previous motion vectors for a plurality of adjacent blocks provided in one direction of the reference block as the first candidate motion vector for the reference block.

According to still another aspect of the present invention, the selecting the final motion vector comprises selecting the final motion vector based on a motion prediction error value of each of the second candidate motion vectors and a vector difference between each of the second candidate motion vectors and previous motion vectors corresponding to blocks adjacent to a reference block which is set from among the plurality of the blocks.

According to still another aspect of the present invention, the selecting the final motion vector comprises calculating the vector difference by giving different weights to the previous motion vectors corresponding to the adjacent blocks based on distances between the reference block and the adjacent blocks.

BRIEF DESCRIPTION OF THE DRAWINGS

The above and/or other aspects of the present invention will become apparent and more readily appreciated from the following description of the embodiments, taken in conjunction with the accompanying drawings, in which:

FIG. 2 is a detailed control block diagram of a motion estimating part provided in a motion estimator according to an exemplary embodiment of the present invention;

DETAILED DESCRIPTION OF EXEMPLARY EMBODIMENTS

Reference will now be made in detail to exemplary embodiments of the present invention, examples of which are illustrated in the accompanying drawings.

Figure 1:
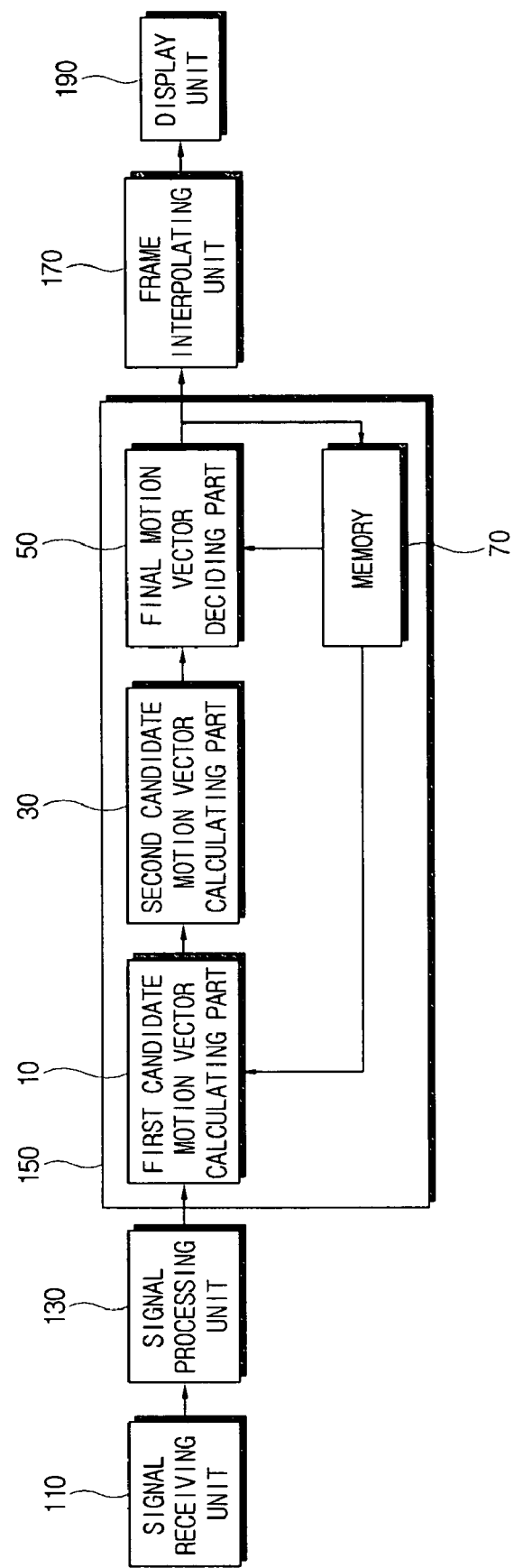
FIG. 1 is a control block diagram of a motion estimator according to an exemplary embodiment of the present invention.

Referring to FIG. 1, a motion estimator according to an exemplary embodiment of the present invention generates an interpolation frame based on a current frame and a previous frame. To this end, the motion estimator includes a motion estimating unit 150 including a first candidate motion vector calculating part 10, a second candidate motion vector calculating part 30 and a final motion vector deciding part 50. The motion estimator may further include a signal receiving unit 110, a signal processing unit 130 and a frame interpolating unit 170. Moreover, the motion estimator may further include a display unit 190 if necessary.

The signal receiving unit 110 receives a video signal from an external video source. To this end, the signal receiving unit 110 may include terminals through which different video signals of different formats may be input, for example, at least one of a composite input terminal for composite signals, an S-video input terminal for S-video signals, a component input terminal for component signals, a personal computer (PC) input terminal for PC signals, and a television (TV) input terminal for TV signals. The video signal received in the signal receiving unit 110 is displayed on the display unit 190 for each frame.

The signal processing unit 130 processes the video signal input from the signal receiving unit 110 into a format which can be displayed on the display unit 190. Specifically, the signal processing unit 130 processes an image corresponding to the video signal such that the image can be displayed on the display unit 190, under control of a control unit (not shown).

Although it is shown in FIG. 1 that the signal processing unit 130 is placed at an input side of the motion estimating unit 150, it should be understood that the signal processing unit 130 may be provided at an output side of the motion estimating unit 150 if necessary.

The motion estimating unit 150 includes a memory 70, in addition to the first candidate motion vector calculating part 10, the second candidate motion vector calculating part 30 and the final motion vector deciding part 50 described above.

The memory 70 stores final motion vectors calculated for each frame. In this case, the memory 70 may store final motion vectors for a plurality of frames as previous motion vectors, or store only final motion vectors for a frame immediately before a current frame as previous motion vectors.

The first candidate motion vector calculating part 10 divides a frame into a plurality of blocks and calculates a plurality of first candidate motion vector groups for each of the blocks based on the previous motion vector(s) estimated previously. In this exemplary embodiment, it is preferable, but not necessary, that the final motion vectors for the previous frame are stored as the previous motion vectors and the first candidate motion vector calculating part 10 calculates the plurality of first candidate motion vector groups based on the previous motion vectors stored in the memory 70.

That is, the first candidate motion vector calculating part 10 calculates first candidate motion vectors for each of the plurality of blocks according to a predetermined motion vector calculating method. Here, the calculated first candidate motion vectors for each block by one motion vector calculating method define a first candidate motion vector group.

A method by which the first candidate motion vector calculating part 10 calculates the first candidate motion vectors will be described in detail later with reference to FIGS. 2, 3A and 3B.

The second candidate motion vector calculating part 30 calculates second candidate motion vectors for each block for each of the plurality of first candidate motion vector groups calculated in the first candidate motion vector calculating part 10. Accordingly, a plurality of second candidate motion vectors are provided as the plurality of first candidate motion vector groups are provided.

A method by which the second candidate motion vector calculating part 30 calculates the second candidate motion vectors will be described in detail later with reference to FIGS. 2, 3A and 3B.

The final motion vector deciding part 50 selects one of the plurality of second candidate motion vectors output from the second candidate motion vector calculating part 30 and outputs the selected one as a final motion vector for a block to be interpolated. At this time, the final motion vector deciding part 50 selects one second candidate motion vector according to a predetermined criterion. In this case, the criterion on which the final motion vector deciding part 50 decides the final motion vector is to select a vector having a minimum value of a cost function. Various error estimating methods may be used for the purpose of selecting the vector having the minimum value of a cost function.

An interpolation frame is generated based on the decided final motion vector. That is, the final motion vector decided by the final motion vector deciding part 50 is used to enable the frame interpolating unit 170 to generate an interpolation frame. Specifically, the frame interpolating unit 170 interpolates the interpolation frame between the current frame and the previous frame based on the final motion vector.

A method by which the final motion vector deciding part 50 calculates the final motion vector will be described in detail later with reference to FIGS. 2, 3A and 3B.

The display unit 190 is input with the video signal received through the signal receiving unit 110 and displays an image on a screen for each frame. The display unit 190 includes a display module (not shown) on which the image is displayed and a module driver (not shown) for processing the input video signal to enable the image to be displayed on the display module.

In this exemplary embodiment, the display module may include various types of display modules such as Cathode Ray Tube (CRT), Digital Light Processing (DLP), Liquid Crystal Display (LCD), Plasma Display Panel (PDP), and the like. In case where the display module is a DLP module, the module driver includes an optical engine. In case where the display module is LCD, the module driver includes a printed circuit board for converting an input video signal into a data signal and a gate signal. Similarly, according to the type of display module, the display unit 190 may include corresponding configuration of the module driver.

Hereinafter, a method by which the motion estimating unit 150 estimates the final motion vector in accordance with an exemplary embodiment of the present invention will be described in detail with reference to FIGS. 2, 3A and 3B.

As described earlier, the motion estimating unit 150 includes the first candidate motion vector calculating part 10, the second candidate motion vector calculating part 30 and the final motion vector deciding part 50.

The first candidate motion vector calculating part 10 may include an average filtering part 11, a line average filtering part 12, a null (0) vector filtering part 13, a global vector calculating part 14, a left block filtering part 15 and a right block filtering part 16, as shown in FIG. 2. However, only if the first candidate motion vector calculating unit 10 can calculate the first candidate motion vectors, configuration thereof and a method for calculating the first candidate motion vectors are not limitative.

Previous motion vectors stored in the memory 70 are input to the average filtering part 11 of the first candidate motion vector calculating unit 10. The average filtering part 11 divides a frame into a plurality of blocks and sets one of the plurality of blocks as a reference block (a block B used to estimate motion of the frame). The average filtering part 11 averages previous motion vectors for the reference block B and a plurality of predetermined blocks P0, P1, P2, P3, P5, P6, P7, and P8 adjacent to the reference block B, and produces the resultant average value as a first candidate motion vector for the reference block B. That is, in FIG. 3A, an average of the previous motion vectors for nine blocks becomes the first candidate motion vector. In this exemplary embodiment, the number of blocks may be randomly varied by a designer.

Assuming Vaa denotes the first candidate motion vector, Vpi denotes the previous motion vectors corresponding to the reference block B and the adjacent blocks, and the number of reference block B and adjacent blocks is L, the average filtering part 11 may produce the first candidate motion vector Vaa for each block according to the following Equation 1.

$$Vaa = \frac{1}{L}\sum_{i=0}^{L-1} Vpi \qquad \text{[Equation 1]}$$

In this case, the average filtering part 11 sets each of the plurality of blocks as the reference block B and produces the first candidate motion vector Vaa for each block. The first candidate motion vectors Vaa produced in the average filtering part 11 are output to the second candidate motion vector calculating part 30 as one first candidate motion vector group.

In the mean time, the previous motion vectors stored in the memory 70 are input to the line average filtering part 12 of the first candidate motion vector calculating unit 10. The line average filtering part 12 divides a frame into a plurality of blocks and sets one of the plurality of blocks as a reference block B. The line average filtering part 12 averages previous motion vectors for the reference block B and a plurality of blocks included in a line to which the reference block B belongs and produces the resultant average value as a first candidate motion vector Vbb.

Figure 3A:
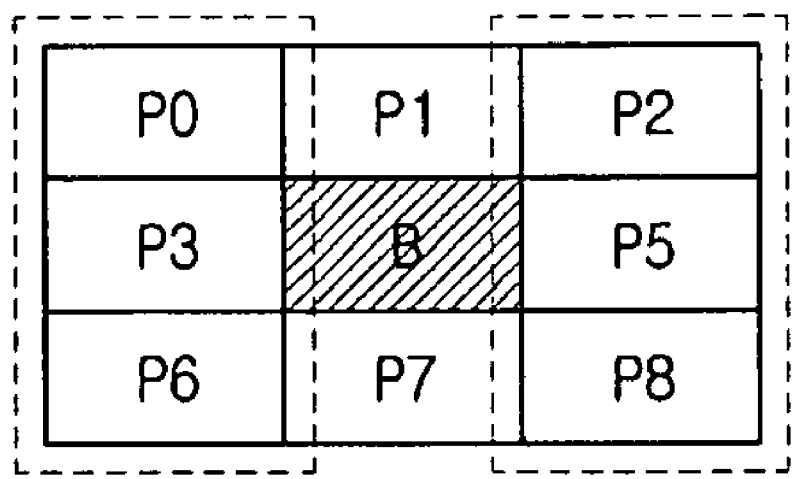
FIG. 3A is a view showing a reference block and a plurality of adjacent blocks in a motion estimator according to an exemplary embodiment of the present invention.
Figure 3B:
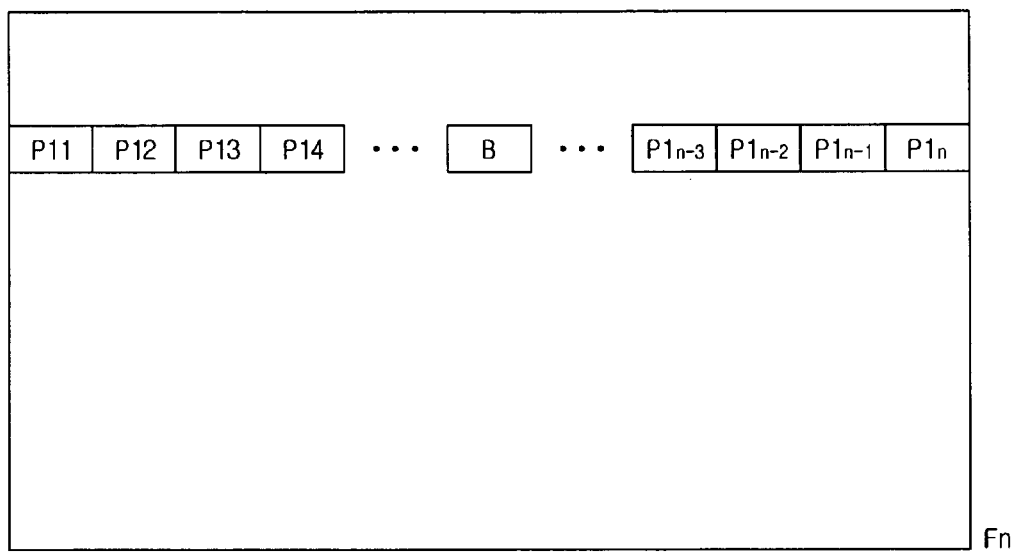
FIG. 3B is a view showing a reference block and a plurality of adjacent row blocks in a motion estimator according to an exemplary the embodiment of the present invention and FIG. 4 illustrates a motion estimating method according to an exemplary embodiment of the present invention.

In this exemplary embodiment as shown in FIG. 3B, it is preferable, but not necessary, that the line average filtering part 12 averages previous motion vectors for a plurality of blocks P11, P12, P13, P14, . . . , P1$n$–3, P1$n$–2, P1$n$–1 and P1$n$ included in a row in which the reference block B is placed and produces the resultant average value as the first candidate motion vector Vbb for the reference block B. However, it is possible that previous motion vectors for the plurality of blocks included in a column may be averaged. The previous motion vectors for the plurality of blocks included in the row in which the reference block B is placed is hereinafter referred to as previous row motion vectors for the plurality of blocks.

In the mean time, the line average filtering part 12 may average only previous row motion vectors for the plurality of blocks included in the row in which the reference block B is placed, which are greater than a first threshold θv, and produce the resultant average value as the first candidate motion vector Vbb for the reference block B.

In addition, the line average filtering part 12 may average only previous row motion vectors having a difference between the previous row motion vectors and previous motion vectors for blocks adjacent to the reference block B, smaller than a second threshold θm, and produces the resultant average value as the first candidate motion vector Vbb for the reference block B. This is because there is a possibility that the previous row motion vectors have errors if the previous row motion vectors have a great difference from the previous motion vectors for the adjacent blocks.

Assuming Vbb denotes the first candidate motion vector, Vpn denotes the previous row motion vectors, Vpi denotes the previous motion vectors corresponding to the adjacent blocks of the reference block B, and the number of reference block B and adjacent blocks is N, the line average filtering part 12 may produce the first candidate motion vector Vbb for each block according to the following Equation 2.

$$Vbb = \frac{1}{N}\sum_{i=0}^{N-1} Vpn \quad \text{[Equation 2]}$$

$$|Vpn| \geq \theta v \text{ and } \sum_{i=0}^{N-1} |Vpn - Vpi| \leq \theta m$$

In this case, the line average filtering part 12 sets each of the plurality of blocks as the reference block B and produces the first candidate motion vector Vbb for each block. The first candidate motion vectors Vbb produced in the line average filtering part 12 are output to the second candidate motion vector calculating part 30 as one first candidate motion vector group.

In the mean time, the previous motion vectors stored in the memory 70 are input to the null vector filtering part 13 of the first candidate motion vector calculating unit 10. The null vector filtering part 13 divides a frame into a plurality of blocks and sets one of the plurality of blocks as a reference block B.

In addition, the null vector filtering part 13 may output the previous motion vectors, which are provided from the memory 70, to the second candidate motion vector calculating part 30 as a first motion vector Vcc. That is, the null vector filtering part 13 may bypass the input previous motion vectors to output it to the second candidate motion vector calculating part 30. Alternatively, the null vector filtering part 13 may not be separately prepared and the previous motion vectors stored in the memory 70 may be directly applied from the memory 70 to the second candidate motion vector calculating part 30.

In this exemplary embodiment, the previous motion vectors filtered in the null vector filtering part 13 are preferably, but not necessarily, vectors whose magnitude is 0, but this is not limitative.

In the mean time, the previous motion vectors stored in the memory 70 are input to the global vector calculating part 14 of the first candidate motion vector calculating unit 10. The global vector calculating part 14 divides a frame into a plurality of blocks and sets one of the plurality of blocks as a reference block B. In addition, the global vector calculating part 14 may calculate a first candidate motion vector Vdd of the reference block B according to a predetermined global vector calculation equation. Motion vectors according to the global vector calculation equation may be usefully applied in representing motion of an overall screen by motion of a camera or the like. In this exemplary embodiment, the global vector calculation equation may be provided in various ways.

As a simple example, the global vector calculation equation may be provided as the following Equation 3.

$$Vx = a_x \times n + b_x$$

$$Vy = a_y \times m + b_y \quad \text{[Equation 3]}$$

In Equation 3, Vx and Vy as horizontal and vertical components of the first candidate motion vector Vdd according to the global vector calculation equation denote a motion magnitude in an x direction of the first candidate motion vector Vdd and a motion magnitude in a y direction of the first candidate motion vector Vdd, respectively, and n and m denote indexes with respect to a reference block, respectively. $a_x$ and $a_y$ denote zooming factors in the x and y directions, respectively, and $b_x$ and $b_y$ denote panning factors in the x and y directions, respectively.

The global vector calculating part 14 sets each of the plurality of blocks as the reference block B and calculates the first candidate motion vector Vdd for each block. In addition, the first candidate motion vectors Vdd calculated in the global vector calculating part 14 are output to the second candidate motion vector calculating part 30 as one first candidate motion vector group.

In the mean time, the previous motion vectors stored in the memory 70 are input to a one-directional block filtering part (not shown) of the first candidate motion vector calculating unit 10. The one-directional block filtering part divides a frame into a plurality of blocks and sets one of the plurality of blocks as a reference block B. The one-directional block filtering part produces one of the previous motion vectors for the plurality of adjacent blocks provided in one direction of the reference block B as the first candidate motion vector for the reference block B.

In this case, the one-directional block filtering part may produce a previous motion vector having a median magnitude among the previous motion vectors for the plurality of adjacent blocks provided in one direction of the reference block B as the first candidate motion vector for the reference block B.

In this exemplary embodiment, the one-directional block filtering part may include at least one of the left block filtering part 15 and the right block filtering part 16 shown in FIG. 2.

The left block filtering part 15 filters previous motion vectors for some of blocks, which are provided in the left of the reference block B, as left adjacent vectors. Accordingly, the left block filtering part 15 produces a previous motion vector for one of the blocks, which are provided in the left of the reference block B, as a first candidate motion vector Vee.

As one example, with reference to FIG. 3A, an explanation will be given to a case where the left adjacent vectors are previous motion vectors for P0, P3 and P6 blocks. The first candidate motion vector Vee may be produced according to the following Equation 4.

$$Vee = \begin{bmatrix} V0, \text{ if } |V0-V6| \leq |V3-V6| \text{ and } |V0-V3| \leq |V6-V3| \\ V3, \text{ if } |V3-V0| \leq |V6-V0| \text{ and } |V3-V6| \leq |V0-V6| \\ V6, \text{ if } |V6-V0| \leq |V3-V0| \text{ and } |V6-V3| \leq |V0-V3| \end{bmatrix}$$ [Equation 4]

In Equation 4, V0, V3 and V6 denote previous motion vectors corresponding to adjacent blocks provided in the left of the reference block B, respectively.

The right block filtering part 16 filters previous motion vectors for some of blocks, which are provided in the right of the reference block B, as right adjacent vectors. Accordingly, the right block filtering part 16 produces a previous motion vector for one of the blocks, which are provided in the right of the reference block B, as a first candidate motion vector Vff.

As one example, with reference to FIG. 3A, an explanation will be given to a case where the right adjacent vectors are previous motion vectors for P2, P5 and P8 blocks. The first candidate motion vector Vff may be produced according to the following Equation 5.

$$Vff = \begin{bmatrix} V2, \text{ if } |V2-V8| \leq |V5-V8| \text{ and } |V2-V5| \leq |V8-V5| \\ V5, \text{ if } |V5-V2| \leq |V8-V2| \text{ and } |V5-V8| \leq |V2-V8| \\ V8, \text{ if } |V8-V2| \leq |V5-V2| \text{ and } |V8-V5| \leq |V2-V5| \end{bmatrix}$$ [Equation 5]

In Equation 5, V2, V5 and V8 denote previous motion vectors corresponding to adjacent blocks provided in the right of the reference block B, respectively.

The second candidate motion vector calculating part 30 calculates a second candidate motion vector for each block for each first candidate motion vector group.

For example, assuming resolution of a video frame is 720× 480 pixels and a size of the reference block B is 16×16 pixels, 45 blocks are generated in the x direction and 30 blocks are generated in the y direction, thus providing a total of 1350 blocks. Namely, one first candidate motion vector group includes 1350 first candidate motion vectors. Accordingly, if there are six first candidate motion vector groups, the first candidate motion vector calculating part 10 may calculate 8100 first candidate motion vectors.

In this exemplary embodiment, the second candidate motion vector calculating part 30 sets each block as the reference block B and compares the set reference block B with a predetermined search region set in a previous frame, based on a plurality of first candidate motion vectors included in each first candidate motion vector group, to calculate the second candidate motion vectors for each block. Here, the second candidate motion vector calculating part 30 may compare the reference block B with the search region, based on the plurality of first candidate motion vectors included in each first candidate motion vector group, to determine similarity between the reference block B corresponding to the first candidate motion vectors and the search region.

In this exemplary embodiment, the second candidate motion vector calculating part 30 may calculate the second candidate motion vectors for each block using a block matching algorithm. Specifically, the second candidate motion vector calculating part 30 may include a candidate vector calculator for calculating a plurality of motion prediction error values using the block matching algorithm and estimating the second candidate motion vectors for each block from a position having a minimum motion prediction error value.

Thus, the second candidate motion vector calculating part 30 may divide a current frame into a plurality of blocks, find a block most similar to the reference block B in the search region of the previous frame, and then calculate a position relative to the reference block B as the second candidate motion vectors. In this case, the motion prediction error values may be calculated according to various ways such as Sum of Absolute Difference (SAD), Mean Absolute Difference (MAD), or the like.

At this time, the second candidate motion vector calculating part 30 makes a local search around a position shifted by the first candidate motion vectors from a position of the reference block B (a block B of the current frame Fn whose motion is to be estimated) of the current frame. In this case, the second candidate motion vector calculating part 30 compares the reference block B, by use of which a final motion vector is to be estimated, with the predetermined search region set in the previous frame to calculate a plurality of motion prediction error values.

In this exemplary embodiment, the motion prediction error values may be calculated according to the following Equation 6.

$$\Phi(Vi) = \sum_{X \in B} |Fn-1(X+Vi) - Fn(X)|$$ [Equation 6]

In Equation 6, Fn denotes the current frame, Fn−1 denotes the previous frame, Φ(Vi) denotes the motion prediction error value, B denotes the reference block, S denotes the search region, Vi denotes a vector representing a position relative to the reference block in the search region, and X denotes a coordinate of a pixel belonging to the reference block. Here, the second candidate motion vector calculating part 30 may set a search region in the reference block after applying the first candidate motion vectors.

In this case, the second candidate motion vector calculating part 30 may select a vector having the minimum value of the motion prediction error value Φ(Vi) in the search region S as a second candidate motion vector.

As shown in FIG. 2, a first calculating part 31 of the second candidate motion vector calculating part 30 calculates second candidate motion vectors Va based on the first candidate motion vectors Vaa output from the average filtering part 11 and outputs the calculated second candidate motion vector Va to the final motion vector deciding part 50. Similarly, second to sixth calculating parts 32 to 36 of the second candidate motion vector calculating part 30 calculates respective second candidate motion vectors Vb to Vf based on the respective first candidate motion vectors Vbb to Vff output from the first candidate motion vector calculating part 10 and outputs the calculated second candidate motion vectors Vb to Vf to the final motion vector deciding part 50.

The final motion vector deciding part 50 decides a final motion vector for each block based on motion prediction error values of the plurality of second candidate motion vectors Va to Vf. In addition, the final motion vector deciding part 50 may decide the final motion vector based on the motion prediction error values of the second candidate motion vectors and vector differences between the second candidate motion vectors and the previous motion vectors corresponding to blocks adjacent to the reference block. In this exemplary embodiment, for example, if six first candidate motion vector groups are calculated, six second candidate motion vectors per block are applied to the final motion vector deciding part 50. Accordingly, the final motion vector deciding part 50 may decide one of the six second candidate motion vectors as the final motion vector for one block.

The final motion vector deciding part 50 may calculate the vector differences based on distance differences between the reference block B corresponding to the second candidate motion vectors and the adjacent blocks. In this case, the final motion vector deciding part 50 may calculate the vector differences by giving different weights to the previous motion vectors corresponding to the adjacent blocks.

For example, if the reference block B and the adjacent blocks P0, P1, P2, P3, P5, P6, P7 and P8 are set as shown in FIG. 3A, weights W0, W1, W2, W3, W5, W6, W7 and W8 are given to the adjacent blocks P0, P1, P2, P3, P5, P6, P7 and P8, respectively, and a weight W4 is given to the reference block B. In this case, it is preferable, but not necessary, that W4 is the highest weight and P2 and P6 are relatively low weights.

The vector differences represent values accumulated by weighting differences between the second candidate motion vectors and the stored previous motion vectors for the adjacent blocks of the previous frames with values proportional to distances between the reference block B and the adjacent blocks. The vector differences may be used to represent correlation between the adjacent blocks and the reference block B. In general, since actual motion vectors between adjacent blocks for each frame are mutually similar, it can be said that motion vectors for the reference block B are correctly estimated as the vector differences become smaller.

In this exemplary embodiment, the final motion vector deciding part 50 may calculate the vector differences according to the following Equation 7.

$$D(V') = \sum_{Vi \in S} Wi \times |V' - Vi| \qquad \text{[Equation 7]}$$

In Equation 7, D(V') denotes a vector difference, Wi denotes a weight of each of the adjacent block, V' denotes a second candidate motion vector, Vi denotes a previous motion vector corresponding to each adjacent block, and S denotes a search region.

The final motion vector deciding part 50 selects one of the plurality of second candidate motion vectors and outputs the selected one as a final motion vector for a block to be interpolated. Such selection may be made by using a predetermined criterion, that is, finding a second candidate motion vector having a minimum value of a specified cost function by applying various error estimation methods.

In this exemplary embodiment, this cost function may be defined as the following Equation 8.

$$E(V') = \phi(V') + \Upsilon \times D(V') \qquad \text{[Equation 8]}$$
$$\phi(V') = \sum_{X \in B} |Fn - 1(X + V') - Fn(X)|$$
$$D(V') = \sum_{Vi \in S} Wi \times |V' - Vi|$$

In Equation 8, E(V') denotes the cost function, Φ(V') denotes a motion prediction error value, γ denotes an adjustment factor for adjusting weights of the motion prediction error value and the vector difference, D(V') denotes the vector difference, V' denotes a second candidate motion vector, and Vi denotes a previous motion vector for a block to which a weight is given.

In general, since a weight of the vector difference is lower than that of the motion prediction error value, γ is preferably smaller than 1, but this is not limitative.

The final motion vector deciding part 50 outputs the decided final motion vector to the memory 70 and the frame interpolating unit 170. The decided final motion vector is used as a basis for generating an interpolation frame inserted between a current frame and a previous frame.

Hereinafter, a motion estimating method according to an exemplary embodiment of the present invention will be described with reference to FIG. 4.

Figure 4:
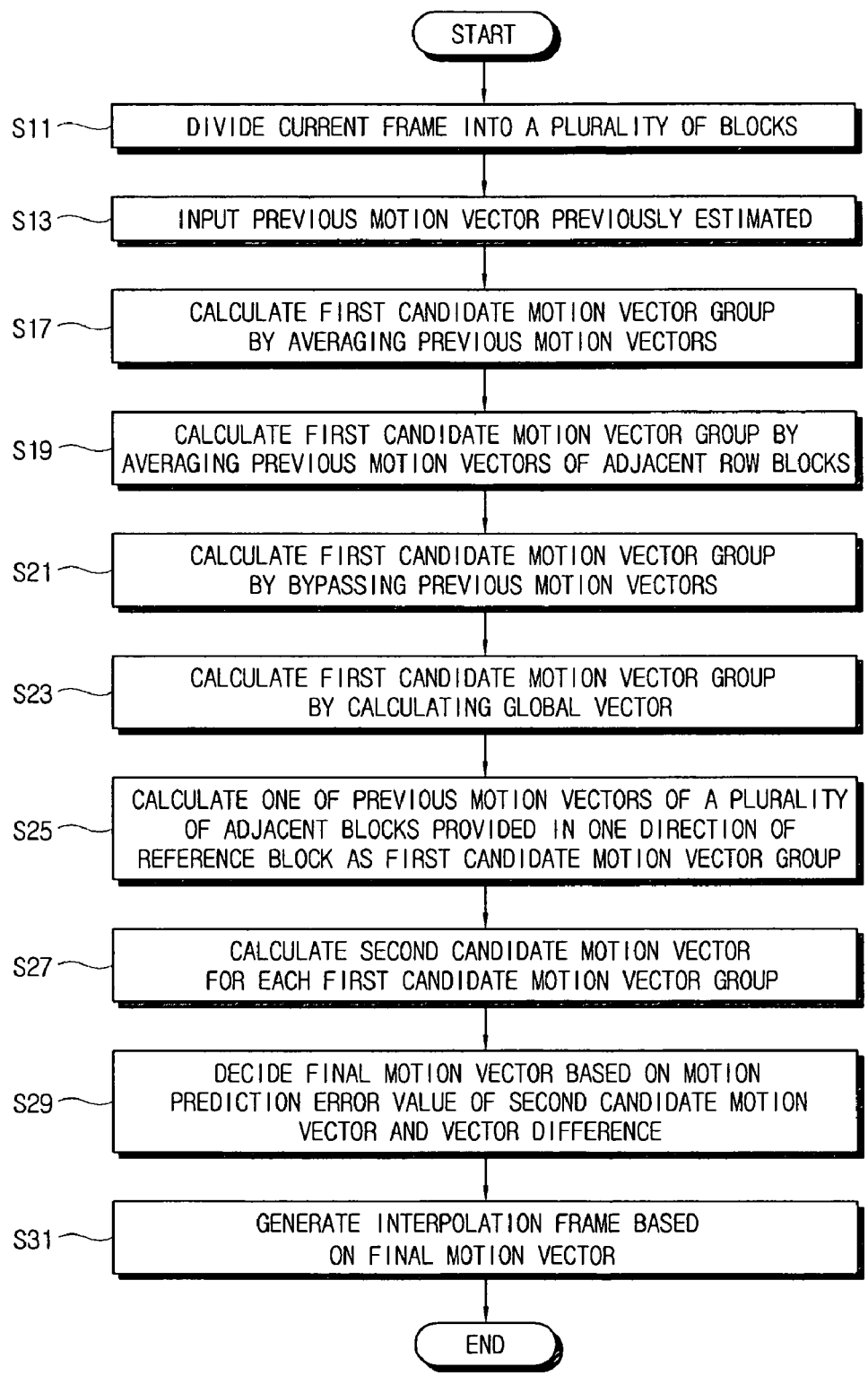

As shown in FIG. 4, at operation S11, the first candidate motion vector calculating part 10 divides a frame into a plurality of blocks. Next, when a previous motion vector for each block is input from the memory 70 to the first candidate motion vector calculating part 10 at operation S13, the first candidate motion vector calculating part 10 calculate a based on the input previous motion vectors at operation. To calculate the plurality of first candidate motion vector groups, the first candidate motion vector calculating part 10 may include the average filtering part 11, the line average filtering part 12, the null vector filtering part 13, the global vector calculating part 14, and the one-directional block filtering part which may further include the left block filtering part 15 and the right block filtering part 16. Since a method of calculating the first candidate motion vector groups has been described earlier, explanation thereof will be here omitted for the sake of brevity.

At operation S17, the average filtering part 11 averages previous motion vectors corresponding to the reference block B and adjacent blocks of the previous frame to produce a first candidate motion vector group. At operation S19, the line average filtering part 12 averages the previous motion vectors for adjacent row blocks included in a row in which the reference block B is placed, for example, to produce a first candidate motion vector group.

At operation S21, the null vector filtering part 13 bypasses the previous motion vectors to calculate the first candidate motion vector group. In this exemplary embodiment, the previous motion vectors may include only vectors whose magnitude is 0. At operation S23, the global vector calculating part 14 calculates a first candidate motion vector group according to a global vector calculation equation based on the previous motion vectors. At operation S25, the one-directional block filtering part calculates one of the previous motion vectors for a plurality of adjacent blocks provided in one direction of the reference block B as a first candidate motion vector group.

All of the produced and calculated first candidate motion vector groups are output to the second candidate motion vector calculating part 30. At operation S27, the second candidate motion vector calculating part 30 calculates a plurality of second candidate motion vectors based on first candidate motion vectors included in the first candidate motion vector groups. In this case, the second candidate motion vector calculating part 30 may calculate the second candidate motion vectors based on search regions determined with respect to the first candidate motion vectors.

The final motion vector deciding part 50 decides a final motion vector for each block based on the second candidate motion vectors calculated in the second candidate motion vector calculating part 30. In this case, at operation S29, the final motion vector deciding part 50 may decide a final motion vector for each block based on motion prediction error values and vector differences of the second candidate motion vectors. At operation S31, the frame interpolating unit 170 generates an interpolation frame based on the decided final motion vector.

If the motion estimator of an exemplary embodiment of the present invention includes the display unit 190, the display unit 190 displays the previous frame, the interpolation frame and the current frame.

As described above, the motion estimator of an exemplary embodiment of the present invention can more precisely predict motion of frames using final motion vectors for previous frames.

In addition, since the first candidate motion vector calculating part 10 of the motion estimator of an exemplary embodiment of the present invention calculates the first candidate motion vectors based on the previous motion vectors in various ways, the final motion vector can be more precisely calculated in accord with various changes of images.

Moreover, since the final motion vector deciding part 50 of the motion estimator of the present invention decides the final motion vector based on the motion prediction error values and the vector differences, the final motion vector can be more precisely calculated.

As apparent from the description, the present invention provides a motion estimator and a motion estimating method, which are capable of generating a motion vector closest to real motion, on the basis of which an interpolation frame is generated.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A motion estimator for generating an interpolation frame based on a current frame and a previous frame, the motion estimator comprising:
a processor configured to provide:
a first candidate motion vector calculating unit which divides the current frame into a plurality of blocks and generates a plurality of first candidate motion vector groups, each of the first candidate motion vector groups comprising a first candidate motion vector for each of the plurality of the blocks calculated based on a previous motion vector previously estimated;
a second candidate motion vector calculating unit which calculates a plurality of second candidate motion vectors for each of the plurality of the blocks, each of the plurality of the second candidate motion vectors being calculated based on a respective first candidate motion vector included in each of the first candidate motion vector groups; and
a final motion vector deciding unit which selects a final motion vector for each of the plurality of the blocks from among the plurality of the second candidate motion vectors,
wherein the interpolation frame is generated based on the final motion vector, and
wherein the second candidate motion vector calculating unit divides the current frame into the plurality of blocks, sets each of the plurality of blocks as a reference block, compares the reference block with a search region set in the previous frame based on the respective first candidate motion vector included in each of the first candidate motion vector groups, and calculates each of the second candidate motion vectors based on a result of the comparison.

2. The motion estimator according to claim 1, wherein the previous motion vector comprises a final motion vector for the previous frame.

3. The motion estimator according to claim 1, wherein the first candidate motion vector calculating unit sets each of the plurality of the blocks as a reference block, and averages previous motion vectors for the reference block and a plurality of blocks adjacent to the reference block to calculate a resultant average value as the first candidate motion vector for the reference block.

4. The motion estimator according to claim 1, wherein the first candidate motion vector calculating unit sets each of the plurality of the blocks as a reference block, and averages previous motion vectors for a plurality of blocks included in a row in which the reference block is placed to calculate a resultant average value as the first candidate motion vector for the reference block.

5. The motion estimator according to claim 4, wherein the magnitude of each of the previous motion vectors for the plurality of the blocks included in the row in which the reference block is placed is greater than a first threshold.

6. The motion estimator according to claim 5, wherein a difference between the previous motion vectors for the plurality of the blocks included in the row in which the reference block is placed, and previous motion vectors for blocks adjacent to the reference block, is smaller than a second threshold.

7. The motion estimator according to claim 1, wherein, the first candidate motion vector calculating unit outputs the previous motion vector to the second candidate motion vector calculating unit as the first candidate motion vector.

8. The motion estimator according to claim 7, wherein the previous motion vector is a null vector.

9. The motion estimator according to claim 1, wherein the first candidate motion vector calculating unit sets each of the plurality of the blocks as a reference block, and calculates the first candidate motion vector for the reference block according to a global vector calculation equation.

10. The motion estimator according to claim 9, wherein the global vector calculation equation comprises the following equation:

$$Vx = a_x \times n + b_x$$

$$Vy = a_y \times m + b_y$$

where, Vx and Vy are components of the first candidate motion vector in x and y directions, respectively; and n and m denote indexes with respect to the reference block; $a_x$ and $a_y$ denote zooming factors in the x and y directions, respectively; and $b_x$ and $b_y$ denote panning factors in the x and y directions, respectively.

11. The motion estimator according to claim 1, wherein the first candidate motion vector calculating unit sets each of the plurality of the blocks as a reference block, and selects one of previous motion vectors for a plurality of adjacent blocks provided in one direction of the reference block as the first candidate motion vector for the reference block.

12. The motion estimator according to claim 11, wherein a previous motion vector having a median magnitude of the previous motion vectors for the plurality of the adjacent blocks provided in the one direction of the reference block is selected as the first candidate motion vector for the reference block.

13. The motion estimator according to claim 12, wherein the first candidate motion vector is selected according to the following equation:

$$\text{FIRST CANDIDATE MOTION VECTOR} = \begin{cases} Va, & \text{if } |Va-Vc| \leq |Vb-Vc| \text{ and } |Va-Vb| \leq |Vc-Vb| \\ Vb, & \text{if } |Vb-Va| \leq |Vc-Va| \text{ and } |Vb-Vc| \leq |Vb-Vc| \\ Vc, & \text{if } |Vc-Va| \leq |Vb-Va| \text{ and } |Vc-Vb| \leq |Va-Vb| \end{cases}$$

where, Va, Vb and Vc denote the previous motion vectors corresponding to three adjacent blocks provided in the one direction of the reference block.

14. The motion estimator according to claim 13, wherein the plurality of the adjacent blocks provided in the one direction of the reference block comprises at least one of a plurality of blocks included in a column provided in the left of the reference block and a plurality of blocks included in a column provided in the right of the reference block.

15. The motion estimator according to claim 1, wherein, in order to calculate each of the second candidate motion vectors, the second candidate motion vector calculating unit determines similarity between the reference block and the search region.

16. The motion estimator according to claim 15, wherein the similarity between the reference block and the search region is determined based on a motion prediction error value with respect to the reference block.

17. The motion estimator according to claim 16, wherein the motion prediction error value is calculated according to a block matching algorithm.

18. The motion estimator according to claim 1, wherein the final motion vector deciding unit selects the final motion vector for each of the plurality of the blocks based on a motion prediction error value of each of the second candidate motion vectors.

19. The motion estimator according to claim 1, wherein the final motion vector deciding unit selects the final motion vector based on a motion prediction error value of each of the second candidate motion vectors and a vector difference between each of the second candidate motion vectors and previous motion vectors corresponding to blocks adjacent to the reference block.

20. The motion estimator according to claim 19, wherein the final motion vector deciding unit calculates the vector difference by giving different weights to the previous motion vectors corresponding to the adjacent blocks based on distances between the reference block and the adjacent blocks.

21. The motion estimator according to claim 19, the motion estimator further comprising a frame interpolating unit which generates an interpolation frame inserted between the current frame and the previous frame based on the final motion vector.

22. The motion estimator according to claim 1, wherein the final motion vector deciding unit calculates the vector difference according to the following equation:

$$D(V') = \sum_{Vi \in S} Wi \times |V' - Vi|$$

where, $D(V')$ denotes the vector difference, Wi denotes a weight for each of the adjacent blocks, V' denotes each of the second candidate motion vectors, Vi denotes a previous motion vector corresponding to each of the adjacent block, and S denotes the search region.

23. The motion estimator according to claim 22, wherein the final motion vector deciding unit selects a second candidate motion vector, having a minimum value of a cost function determined by the following equation, as the final motion vector:

$$E(V') = \phi(V') + \Upsilon \times D(V')$$
$$\phi(V') = \sum_{X \in B} |Fn - 1(X + V') - Fn(X)|$$
$$D(V') = \sum_{Vi \in S} Wi \times |V' - Vi|$$

where, $E(V')$ denotes the cost function, Fn denotes the current frame, Fn−1 denotes the previous frame, $\Phi(V')$ denotes the motion prediction error value, γ denotes an adjustment factor for adjusting weights of the motion prediction error value and the vector difference, $D(V')$ denotes the vector difference, B denotes the reference block, S denotes the search region, V' denotes each of the second candidate motion vectors, X denotes a coordinate of a pixel belonging to the reference block, and Vi denotes the previous motion vector corresponding to each of the adjacent blocks.

24. A motion estimator for generating an interpolation frame based on a current frame and a previous frame, the motion estimator comprising:
a processor configured to provide:
a first candidate motion vector calculating unit which divides the current frame into a plurality of blocks and calculates a plurality of candidate motion vectors for each of the plurality of the blocks based on a previous motion vector previously estimated;
a second candidate motion vector calculating unit which divides the current frame into the plurality of blocks, sets each of the plurality of blocks as a reference block, compares the reference block with a search region set in the previous frame based on the respective first candidate motion vectors, and calculates each of the second candidate motion vectors based on a result of the comparison; and a final motion vector deciding unit which selects a final motion vector based on a motion prediction error value of each of the plurality of candidate motion vectors and a vector difference between each of the plurality of the candidate motion vectors and previous motion vectors corresponding to blocks adjacent to a reference block which is set from among the plurality of the blocks, wherein the interpolation frame is generated based on the final motion vector.

25. The motion estimator according to claim 24, wherein the final motion vector deciding unit calculates the vector difference by giving different weights to the previous motion vectors corresponding to the adjacent blocks based on distances between the reference block and the adjacent blocks.

26. The motion estimator according to claim 25, wherein the final motion vector deciding unit selects a candidate motion vector, having a minimum value of a cost function determined by the following equation, as the final motion vector:

$$E(V') = \phi(V') + \Upsilon \times D(V')$$
$$\phi(V') = \sum_{X \in B} |Fn - 1(X + V') - Fn(X)|$$
$$D(V') = \sum_{Vi \in S} Wi \times |V' - Vi|$$

where, E(V') denotes the cost function, Fn denotes the current frame, Fn−1 denotes the previous frame, Φ(V') denotes the motion prediction error value γ denotes an adjustment factor for adjusting weights of the motion prediction error value and a vector difference, D(V') denotes the vector difference, B denotes the reference block, S denotes a search region used to calculate the plurality of the candidate motion vectors, V' denotes each of the plurality of the candidate motion vectors, X denotes a coordinate of a pixel belonging to the reference block, Vi denotes the previous motion vector corresponding to each of the adjacent blocks, and Wi denotes a weight for each of the adjacent blocks.

27. A motion estimation method for generating an interpolation frame based on a current frame and a previous frame, the method comprising:

dividing, with a processor, the current frame into a plurality of blocks;

generating, with the processor, a plurality of first candidate motion vector groups, each of the first candidate motion vector groups comprising a first candidate motion vector for each of the plurality of the blocks calculated based on a previous motion vector previously estimated;

calculating, with the processor, a plurality of second candidate motion vectors for each of the plurality of the blocks, each of the plurality of the second candidate motion vectors being calculated based on a respective first candidate motion vector included in each of the first candidate motion vector groups; and selecting, with the processor, a final motion vector for each of the plurality of the blocks among the plurality of second candidate motion vectors, wherein the interpolation frame is generated based on the final motion vector, and wherein the calculating, with the processor, the plurality of second candidate motion vectors comprises dividing the current frame into the plurality of blocks, setting each of the plurality of blocks as a reference block, comparing the reference block with a search region set in the previous frame based on the respective first candidate motion vector included in each of the first candidate motion vector groups, and calculating each of the second candidate motion vectors based on a result of the comparison.

28. The method according to claim 27, wherein the previous motion vector comprises a final motion vector for the previous frame.

29. The method according to claim 27, wherein the calculating the plurality of first candidate motion vector groups comprises:

setting each of the plurality of the blocks as a reference block;

averaging previous motion vectors for a plurality of blocks included in a row in which the reference block is placed; and calculating a resultant average value as the first candidate motion vector for the reference block.

30. The method according to claim 27, wherein the calculating the plurality of first candidate motion vector groups comprises:

setting each of the plurality of the blocks as a reference block; and selecting one of previous motion vectors for a plurality of adjacent blocks provided in one direction of the reference block as the first candidate motion vector for the reference block.

31. The method according to claim 27, wherein the selecting the final motion vector comprises selecting the final motion vector based on a motion prediction error value of each of the second candidate motion vectors and a vector difference between each of the second candidate motion vectors and previous motion vectors corresponding to blocks adjacent to a reference block which is set from among the plurality of the blocks.

32. The method according to claim 31, wherein the selecting the final motion vector comprises calculating the vector difference by giving different weights to the previous motion vectors corresponding to the adjacent blocks based on distances between the reference block and the adjacent blocks.

* * * * *